United States Patent [19]

Duvall, III et al.

[11] Patent Number: 4,662,741
[45] Date of Patent: May 5, 1987

[54] LINEAR FM CHIRP LASER

[75] Inventors: Robert L. Duvall, III, Torrance; Maurice J. Halmos, Los Angeles; David M. Henderson, Playa del Rey, all of Calif.

[73] Assignee: Hughes Aircraft Company, Los Angeles, Calif.

[21] Appl. No.: 476,288

[22] Filed: Mar. 17, 1983

[51] Int. Cl.⁴ .......................... G01C 3/08; G01P 3/36; H01S 3/00
[52] U.S. Cl. ...................................... 356/5; 332/7.51; 356/28.5
[58] Field of Search .................... 356/5, 28.5; 343/17.2 PC; 332/7.51

[56] References Cited

U.S. PATENT DOCUMENTS

| | | | |
|---|---|---|---|
| 3,363,248 | 1/1968 | Nicodemus | 343/17.2 PC |
| 3,950,100 | 4/1976 | Keene et al. | 356/28.5 |
| 4,190,361 | 2/1980 | Dubrunfaut | 356/5 |
| 4,240,746 | 12/1980 | Courtenay et al. | 356/5 |
| 4,284,351 | 8/1981 | Alldritt et al. | 356/28.5 |
| 4,447,149 | 5/1984 | Marcus et al. | 356/28.5 |

Primary Examiner—Stephen C. Buczinski
Attorney, Agent, or Firm—Ronald L. Taylor; A. W. Karambelas

[57] ABSTRACT

A laser radar system employing a linear FM chirp laser followed by post detection pulse compression by a surface acoustic wave (SAW) device. The heart of the invention is the FM chirp modulator that provides the needed tuning range and linearity for pulse compression. This modulation is accomplished by using a high pressure $CO_2$ laser with an intracavity electric-optic modulator of CdTe. The frequency of the laser is controlled through the voltage applied to the crystal. With the performance the system offers, absolute radar ranges can be measured to 0.22 m and velocities to 0.37 m/sec.

14 Claims, 17 Drawing Figures

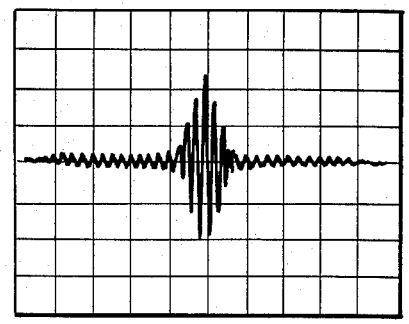
Fig. 14.
Fig. 15.
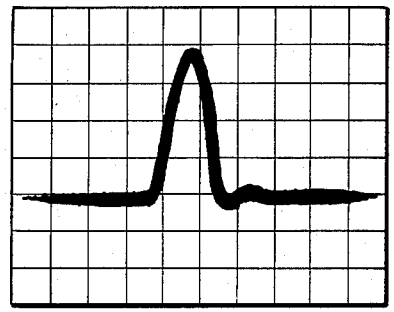
Fig. 16.
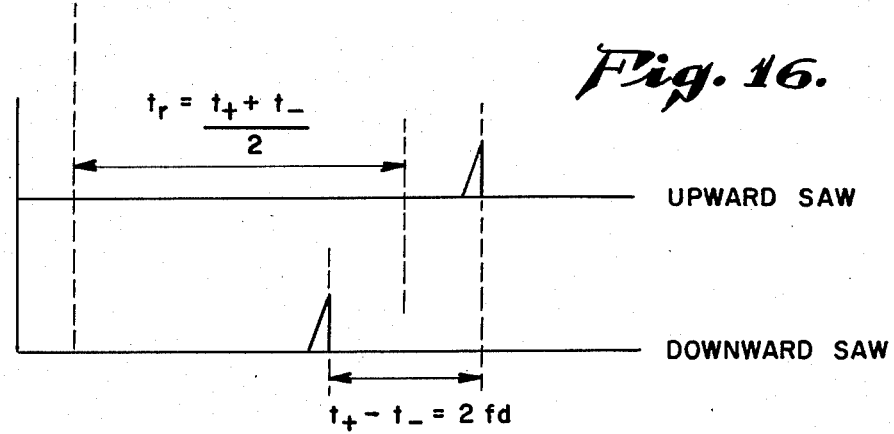

LINEAR FM CHIRP LASER

BACKGROUND OF THE INVENTION

The present invention relates to radar systems and, more particularly, to laser radar systems.

The following references are referred to hereinafter, and the teachings thereof as employed within the present invention are incorporated herein by reference to avoid redundancy and undue complication of this application:

[1] Claude R. Cooke, "Laser Radar Systems, Some Examples", SPIE Vol. 128, pp 103–107 (1977).

[2] P. A. Forrester, K. F. Hulme, Review Laser Rangefinders, Optical and Quantum Electronics, Vol. B, pp 259–293 (1981).

[3] P. M. Woodward, "Probability and Information Theory, with Applications to Radar", Pergamon Press, Oxford, 1953.

[4] C. E. Cook and M. Bernfeld, "Radar Signals an Introduction to Theory and Application", Academic Press, (1967).

[5] K. F. Hulme, B. S. Collins, G. D. Constant, J. T. Pinson, "A $CO_2$ Laser Rangefinder Using Heterodyne Detection and Chirp Pulse Compression", Optical and Quantum Electronics, Vol. 13, pp 35–45 (1981).

[6] J. E. Kiefer, T. A. Nussmeier, and F. E. Goodwin, "Intracavity CdTe Modulators for $CO_2$ Lasers", IEEE Journal of Quantum Electronics, Vol. QE-8, No. 2, pp 171–179, February 1972.

[7] A. Yariv, "Quantum Electronics", John Wiley & Sons Inc., Second Edition, 1975.

[8] A. VanLerberghe, S. Avrillier, and C. J. Borde, "High Stability CW Waveguide $CO_2$ Laser for High Resolution Saturation Spectroscopy", IEEE, Journal of Quantum Electronics, Vol. QE-14, No. 7 pp 481–486, July 1978.

[9] J. R. Klauder, A. C. Price, S. Darlington, and W. J. Albersheim, "The Theory and Design of Chirp Radars", The Bell System Technical Journal, Vol. 34, No. 4, pp 745–808, July 1960.

Radar systems have been employed in both non-military and military applications for a good number of years. In recent years, the technical advances required in radar systems for the military have been considerable. When first employed in World War II, the accuracy and speed of radar were not overly critical. The radar was used to detect slow-moving ships and planes which could then be engaged on a not-too-critical time basis. More recently, speed and accuracy have become critical in order to allow the timely detection and destruction of smaller, fast-moving missiles having high destructive power. In addition, these contemporary radar systems are required to perform in an environment filled with highly efficient countermeasure devices.

Because of its resistance to jamming and interference from outside sources and its superior range and angular accuracy, light has replaced electro-magnetic energy in many applications from the telephone on up. The application of lasers to the radar function is, therefore, logical.

Laser rangefinder techniques have been successfully shown to determine ranges of targets at distances up to five miles with accuracy of 2 to 10 meters [1]. As with conventional radar systems, laser systems may be classified into two basic categories: (1) Direct, or incoherent detection, and (2) Heterodyne or coherent detection.

The theory of the former dictates that the best signal-to-noise ratio is provided when the transmitted energy is concentrated into the shortest possible pulse [2]. This yields a good range measuring and resolution capability. On the other hand, coherent detection requires highest possible average transmitted power for best signal-to-noise, irrespective of pulsewidth. In addition, accurate target radial velocity measurements can be obtained in the latter case. Woodward [3] pointed out, during the early stages of modern radar technology, that radar resolution and accuracy were functions of the signal bandwidth, being AM or FM in nature, regardless of the transmitter waveform. Thus a continuous power, or long pulse mode of operation heterodyne system may also yield good range measuring and resolution capability when using a wideband signal. A more complex receiver is required to extract the wide band information in this type of signal, as opposed to the direct detection system. These receivers, as used in conventional radar systems, are designated as matched-filter signal processing. The advantages of such signal processing techniques in radars, as pointed out by Cook [4], are:

1. More efficient use of the average power available at the transmitter.
2. Increased system·accuracy, both in ranging and velocity measurements.
3. Reduction of jamming vulnerability.

In light of the above, it would seem that heterodyne detection scheme, using wideband signal, would also be beneficial to laser radar systems.

In a recent pulication [5], a laser range using heterodyne detection and chirp pulse compression is described. The wideband signal consists of a linear FM chirp pulse of relative long duration. The matched-filter, at the receiver end is a Surface Acoustic Wave (SAW) device, which compresses the relative long FM chirp pulse into a narrow one (of the same bandwidth), from which the range and velocity information may be extracted. The duration of the compressed pulse is approximately the inverse of the bandwidth of the original signal. Thus, as the amount of frequency that is chirped increases, so does the resolution of the range and velocity measurements. In the above work, as described in greater detail hereinafter, an acousto-optic modulator, placed at the output of the laser, was used to obtain a chirp width of 14 MHz. This would yield a compressed pulse of the order of 100 ns. Further increases in frequency deviation, with attendant reduction in pulse width, are limited by transit time of the acoustic wave across the optical beam.

Huhne et al (Optical and Quantum Electronics 13, 1981, 35–45), for example, have demonstrated a $CO_2$ laser range finder using FM chirp modulation and pulse compression. They modulate the laser outside the laser cavity using acoustic optic (AO) modulation. It is an object of the present invention to provide an order of magnitude increase in range resolution because of wider frequency deviation employing an electro-optic (EO) modulator and a high pressure $CO_2$ laser.

The Huhne et al. approach is shown in simplified form in FIG. 1. The laser is shown generally as 10 and comprises, in the usual manner, a high reflectivity end mirror 19 and an output mirror 20 on the other end between which the laser gain medium generally indicated as 22 is contained. As the laser light 18 emerges from the cavity of the laser 10 through mirror 20, it passes through the acousto-optic element 24 which is driven by modulating driver 26, which imparts the modulation thereto.

Stein (IEE J. of Quantum Electronics, Aug. 1975, 630-31) previously used intracavity EO modulation to chirp a high pressure laser in a radar system that does not use pulse compression. However, he only achieved a 20 MHZ chirp with a linear ramp. He makes no mention of the specific percent linearity achieved. From the graphical data he provides, however, it is apparent that an attempt at pulse compression of the type described herein would not have been successful. This difficulty with precise linearity was also encountered by Hulme and Collins [Society of Photo-Optical Instrumentation Engineers' Proceedings; Vol. 236, pp. 135-138]. It is, in fact, this finding that compelled them to use acousto-optic modulation as described above. It is another object of the present invention to provide high linearity of about 100 MHz thus making usable pulse compression possible.

The Stein apparatus is shown in simplified form in FIG. 2 and is similar to the Huhne et al. apparatus, with the exception that the acousto-optic element 24 thereof is replaced by an electro-optic crystal 28 of a conventional variety, which is placed within the cavity of the laser 10 ahead of the output mirror 20.

Wherefore, it is the object of the present invention to provide a laser radar which overcomes the limitations of the prior art described above.

SUMMARY

The foregoing object has been met by the laser radar transmitter/receiver of the present invention comprising: a transmitter laser to emit a first beam of light at approximately a pre-established base frequency; an electro-optical crystal adapted to be connected to an actuating signal and disposed within the cavity of the transmitter laser to modulate the beam of light being emitted therefrom; precision linear driver means operably connected to the electro-optical crystal for applying a linear chirp drive signal thereto; a light oscillator laser including second translator means for causing the oscillator laser to emit a second beam of light at approximately the base frequency; first feedback control means connected to the first translator means and disposed to sense a portion of the first light beam for dynamically adjusting the first translator means to maintain the first light beam at exactly the base frequency; second feedback control means connected to the second translator means and disposed to sense a portion of the second light beam for dynamically adjusting the second translator means to maintain the second light beam at exactly the base frequency; means for transmitting the first light beam as the transmitted beam of the radar; means for receiving the returned portion of the first beam and for heterodyning it with a portion of the second beam to form a combined beam; detector means disposed to have the combined beam impinge thereon for outputting a chirped electrical signal reflecting the combined beam; and, surface acoustic wave delay device means connected to receive the chirped electrical signal at an input thereof for transforming the chirped electrical waveform signal reflection of the combined beam into an electrical pulse waveform signal at an output thereof to be used as the return signal for radar return signal processing.

DESCRIPTION OF THE DRAWINGS

FIG. 14 is a drawing of the r.f. pulse obtained at the output of the SAW.

FIG. 15 is a drawing of the demodulated pulse obtained from the output of the SAW.

FIG. 16 shows a graphical description of Equation 28.

DESCRIPTION OF THE PREFERRED EMBODIMENT

The purpose of the present invention is to measure absolute radar range and velocities of terrain, targets and obstacles. This invention allows better resolution than previously achieved because the chrip modulation technique allows frequency deviation to 100 Mhz with corresponding pulse width of 15 nsec. This is an order of magnitude better than previous state-of-the-art in other FM-CW laser radar approaches. It also provides an absolute range reading that conventional AM-CW laser radars do not. Finally it offers good utilization of the CW laser output as opposed to pulsed systems in which the power is wasted.

In the following, the theoretical background construction, and performance of a $CO_2$ heterodyne system that uses the basic concept for matched-filter signal processing as mentioned above, is described. The transmitter, however, consists of a novel design, which increases the chirp-width by a factor of ten, and avoids any problems of beam steering that may be injected by an acousto-optic modulator. The transmitter laser is frequency modulated by a CdTe FM cut crystal modulator, which is placed inside the laser resonator. Using the intracavity modulator in a testing environment, the applicants obtained linear chirp pulses of approximately 100 MHz. This in turn yielded compressed pulses of 15 ns. Weighted and unweighted processes are also described hereinafter, where the weighting filter is shown to increase the compressed pulse width to 20 ns, while reducing the sidelobes.

Thereafter, the theoretical aspects of the heterodyne system, the laser modulation process, and chirp pulse compression using the SAW device are described. Detailed desciptions of the experimental set up and results are given. Also, non-linear effects are discussed and measured for the experimental results. In the final portion, a usable radar configuration is described, the signal processing for the laser radar system is given, and the limitations of the system are calculated.

THEORETICAL DESCRIPTION

Heterodyne Detection

Heterodyne detection systems are playing an increasing role in the rangefinder field. Some of the clear advantages are:

1. Doppler shifts enable measurement of target radial velocity.
2. There is an energy sensitivity advantage over direct detection typically amounting to a factor of 100 at 10.6 m [5].
3. Less peak power is needed, since long pulses are typically used.

Figure 1:
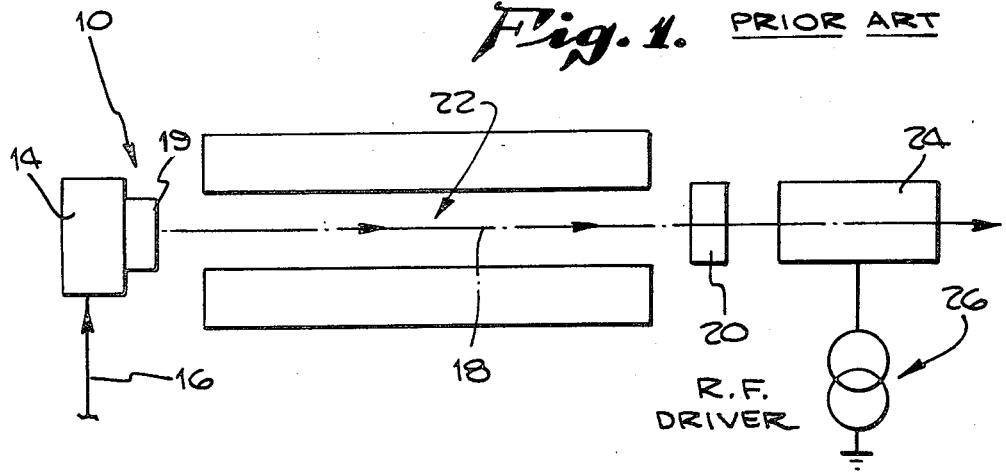
FIG. 1 is a simplified drawing showing a prior art approach to modulating a laser beam outside the laser cavity.
Figure 2:
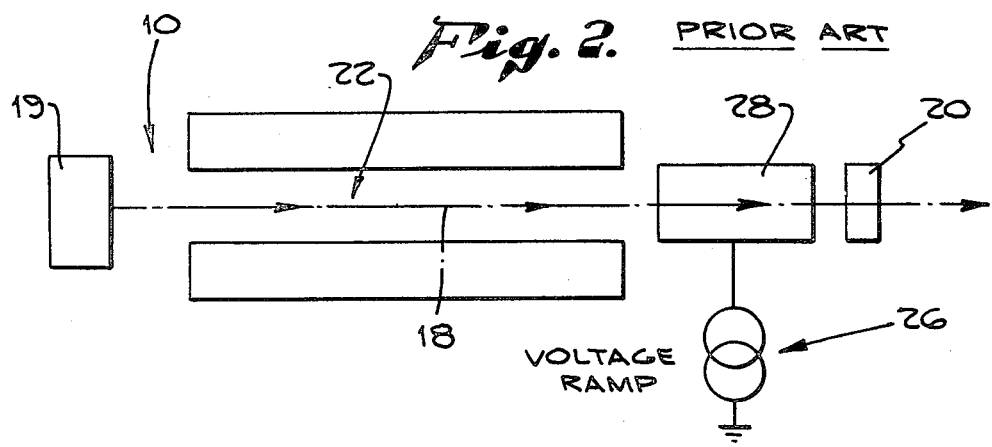
FIG. 2 is a simplified drawing showing a prior art approach to modulating a laser beam inside the laser cavity.
Figure 3:
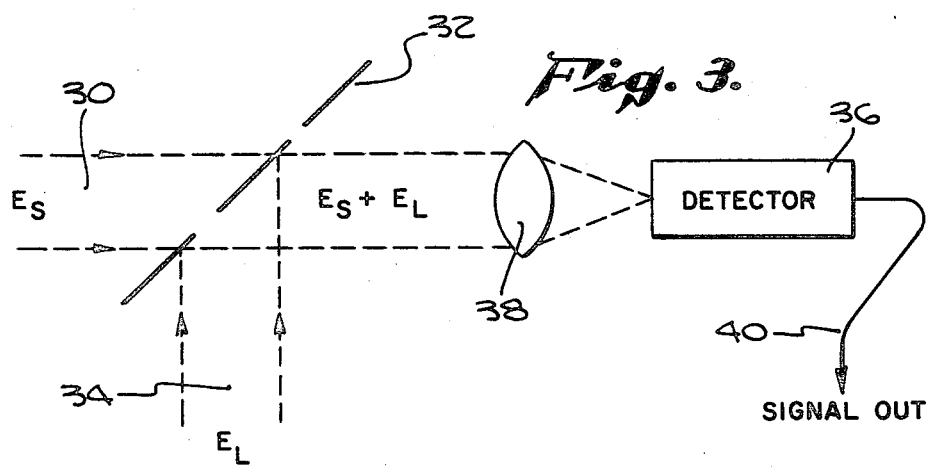
FIG. 3 is a simplified drawing showing a method of detecting a heterodyned light signal.

A typical configuration for heterodyne detection scheme is shown in FIG. 3. The light signal of interest 30 (labelled "$E_S$") is mixed at dielectric beamsplitter 32 with light 34 from a local oscillator (labelled "$E_L$"). It is then focused on detector 36 by lens 38 which results in an electrical signal reflecting $E_S + E_L$ on the output line 40. The signal on line 40 can then be used in the normal manner.

The optical signal may be represented by, $$E_S(t) = A_S(t) \exp j[\omega_S t + \phi_S(t)] + C.C. \quad (1)$$

where $A_S(t)$ is the complex, slow varying amplitude of the field, $\omega_S$ is the center frequency, and $\phi_S(t)$ is the phase of the field which may be a function of time.

The local oscillator is represented by, $$E_L(t) = A_L(t) \exp [j\omega_L t + \phi_L(t)] + C.C. \quad (2)$$

where $A_L(t)$ may be fixed as a constant $A_L$. For all practical purposes we can assume the local oscillator to be perfectly coherent. Thus we allow $\phi_L(t) = 0$.

The a.c. components at the detector end will be $$S_n(t) = |E_S + E_L|^2(t) = A_L A_S(t) \exp j[(\omega_S - \omega_L)t + \phi_S(t)] + C.C. \quad (3)$$

Thus both the amplitude and phase information are preserved, where the carrier frequency has been scaled down to the difference frequency of the received signal and the local oscillator.

LINEAR FM CHIRP

Figure 4:
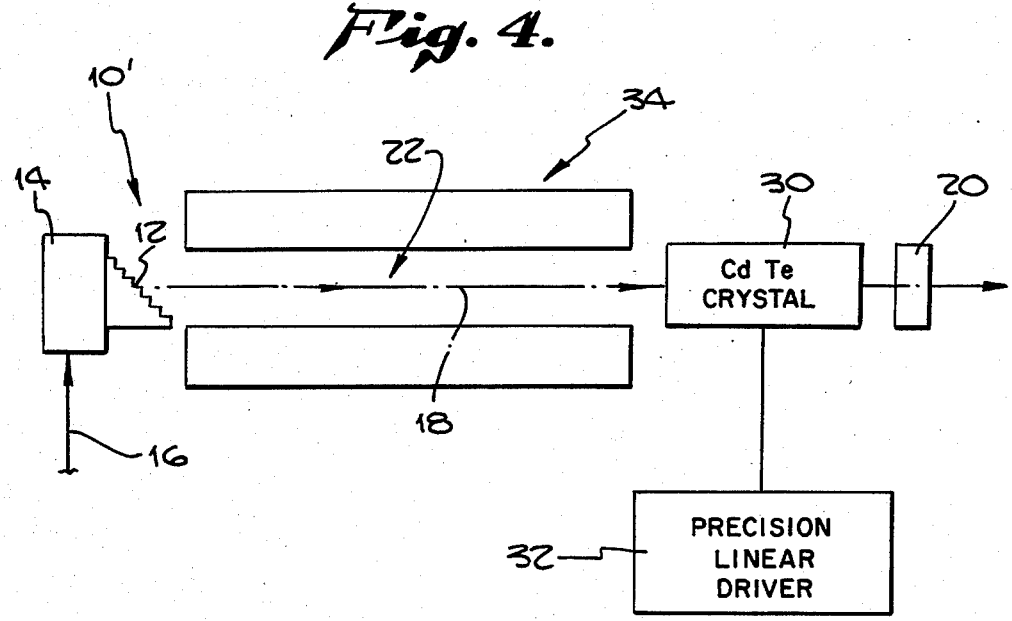
FIG. 4 is a simplified drawing showing the apparatus employed in the present invention for modulating a laser inside the laser cavity.

The frequency modulation of the laser, as described in detail in Reference 6, is accomplished by the use of an internal modulator. FIG. 4 is a diagram showing the basic configuration for the intracavity modulation scheme of the present invention.

The frequency of the laser is changed by electrically modulating the refractive index of a CdTe crystal 30 within the laser cavity. A Littrow grating 12 is used to keep the laser on the desired line.

It is easy to show that the change in frequency, $\Delta \nu$, of the optical field is given by the change in the refractive index of the crystal, by the relationship, $$\Delta \nu / \nu = \Delta \eta (2l/C) \nu_{fsr} \quad (4)$$

where $\nu$ is the laser frequency, $\nu_{fsr}$ is the free spectral range, or mode spacing, l is the length of the crystal, and C is the speed of light. In the expression $\Delta \eta$, the change in refractive index, is given by [7] as $$\Delta \eta = (\eta_o^3 rE)/2$$

where $\eta_o$ is the refractive index of the crystal, r is the corresponding electro-optic tensor element, and E is the applied electric field.

By using the ratio of the applied voltage V and the modulator height d for the electric field, we get $$\frac{\Delta \nu}{\nu_{fsr}} = \frac{V}{\left(\frac{\lambda}{n_o^3 r} \cdot \frac{d}{l}\right)} \quad (5)$$

The term in brackets in equation (5) is recognized as $V_\pi$, whence $$\Delta \nu = (V/V_\pi) \nu_{fsr} \quad (6)$$

For a linear chirp, we set the applied voltage to be a ramp of period T such that equation (6) becomes $$\Delta \nu = \mu t \qquad |t| < T/2$$

where $$\mu = \frac{\left[\frac{\Delta V}{\Delta t}\right]}{V_\pi} \nu_{fsr} = \text{constant}$$

The phase, $\phi_h(t)$, of the heterodyne signal in equation (3) is, $$\phi_h(t) = 2\pi \int_o^t \Delta \nu(t') dt' = 2\pi \frac{\mu t^2}{2} \quad (7)$$

Substituting equation (7) into (3), we obtain for the heterodyne signal, $$S_h(t) = A_h(t) \exp j \left[\omega_h t + 2\pi \frac{\mu t^2}{2} + C.C.\right] \quad (8)$$

for $|t| < T/2$, where we set $$A_h(t) = A_L A_S(t)$$

$$\omega_h = \omega_S - \omega_L$$

Pulse Compression

The filter that compresses the chirp has a linear time delay versus frequency characteristic of the opposite sense to the linear FM sweep. The principles of linear FM sweep matched-filters, are discussed by Cook [4].

Functionally, the time delay of the filter may be expressed by $$t_d = 2K(\omega - \omega_1) + b \tag{9}$$

The associated filter phase shift is $$\beta_f(\omega) = \int t_d d\omega = K(\omega - \omega_1)^2 + b\omega + C_2 \tag{10}$$

Assume that the signal at the input of the filter is as in Equation (8) with $$A_h(t) = \text{constant}$$

and $$S_h(t) = 0 \qquad |t| > T/2$$

Then we have a FM sweep rectangular pulse of duration T.

$$\omega h - (2\pi)(\mu T/2) \leq \omega \leq \omega_h + (2\pi)(\mu T/2)$$

$$\Delta \omega = (2\pi)\mu T$$

Figure 5:
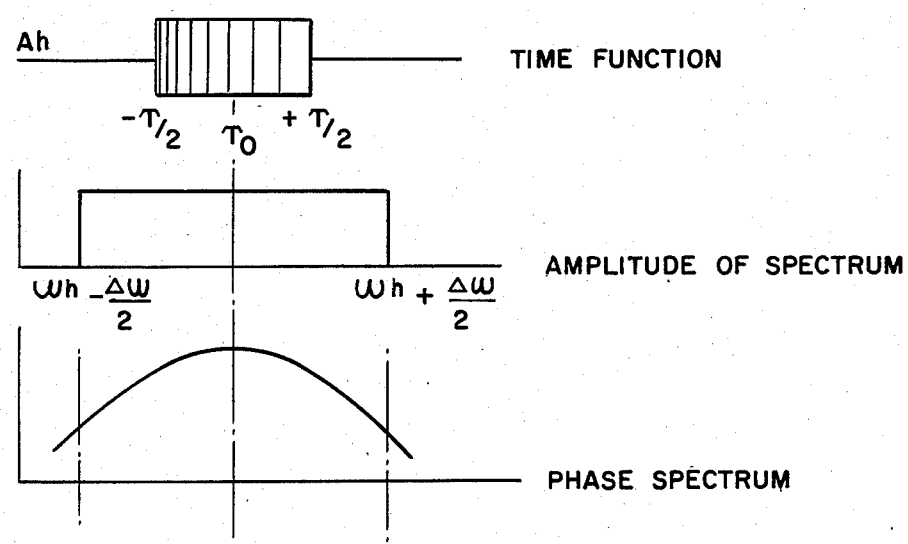
FIG. 5 is a simplified drawing of waveforms occurring in the present invention.

The amplitude of the spectrum is also rectangular shaped. However, the phase contains the well known quadrature given by $$\phi_h(t) = \mu t^2 / 2$$

as shown in FIG. 5.

If the constants $\mu$ and K are properly matched, mainly that $(2\pi)\mu K = \frac{1}{2}$, then the spectrum at the compression filter will consist of the same rectangular amplitude distribution, however the quadratic term of the phase will be cancelled. For this case, the compressed pulse is given by [4] as, $$g(t) = 2\sqrt{\mu} \; \frac{\sin\left[\frac{2\pi\mu t}{2}(T - |t|)\right]}{2\pi\mu t} \cos \omega_h t \quad |t| < T$$

As expected, the shape of the compressed pulse is of the form (sin x)/x, since its frequency distribution is rectangular with linear phase, as mentioned above. The spacing between zeros of the envelope is 2/Δf, and the peak amplitude is $(\sqrt{T\Delta f})\times$(filter attenuation). The pulse width, measured at 4 dB down from the peak amplitude i $\tau_p = 1/\Delta f$.

Figure 6:
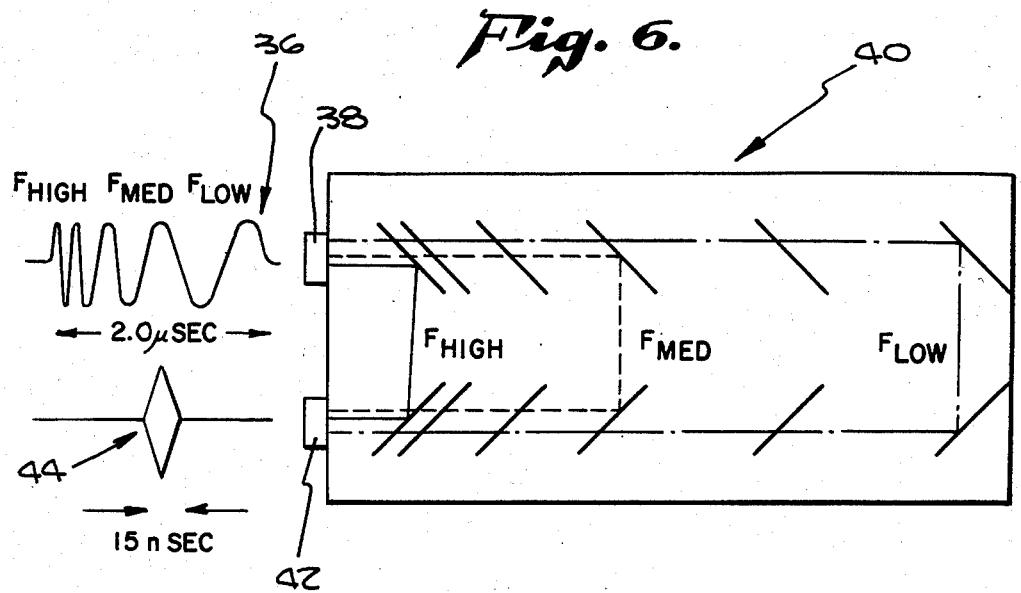
FIG. 6 is a simplified drawing showing the effect of the Surface Acoustic Wave delay device employed in the present invention in converting a chirped electrical signal into a pulsed electrical signal.

The operation of the Surface Acoustic Waveguide is shown in simplified form in FIG. 6. The chirped signal, generally indicated as 36, comprising, for simplicity, "HIGH", "MED", and "LOW" components is applied to the input transducer 38 of the SAW, generally indicated as 40. The different frequencies have individual "resonance" points at which they are reflected across and back towards the output transducer 42. If the "chirp" or change in frequency along the signal 36 is linear, the various time delays result in all the various frequency components arriving at the output transducer 42 substantially simultaneously, resulting in the single output pulse, designated as 44, as desired. By contrast, a non-linear chirp has its energy spread by the SAW 40, producing an unusable output. It is for this reason that linearity is critical and why the technique with an intracavity chirped laser was rejected as impossible by others in the art.

TΔF is the time-bandwidth product, also designated as the compression factor, yielding $$\hat{P}_o/\hat{P}_i = T/\tau_p = T\Delta f \tag{11}$$

where $\hat{P}_o$ is peak compressed power and $\hat{P}_i$ is if not compressed. The (sin x/x) shape of the compressed pulse gives rise to sidelobes extending on either side of the compressed pulse. The first and largest, of these, are 13.5 dB below the peak. In ranging systems, where the reflection amplitude of targets may have a large dynamic range, the sidelobes will obscure low level returns and must be eliminated.

Sidelobe Rejection

To minimize the effects of these unwanted signals, various approaches for controlling the spectrum modulus have been considered [4]. These are in the general area of weighting, or shaping, the spectrum by frequency domain filtering of time domain envelope shaping. In essence, the object is to taper the ends of the rectangular frequency distribution mentioned earlier, because from Fourier analysis, we know that abrupt edges on the frequency spectrum, create sidelobes in the time domain. Filters used for this purpose are designated as weighting filters. In the next section the use of these filters and their effects is exemplified.

EXPERIMENTAL SETUP

Figure 7:
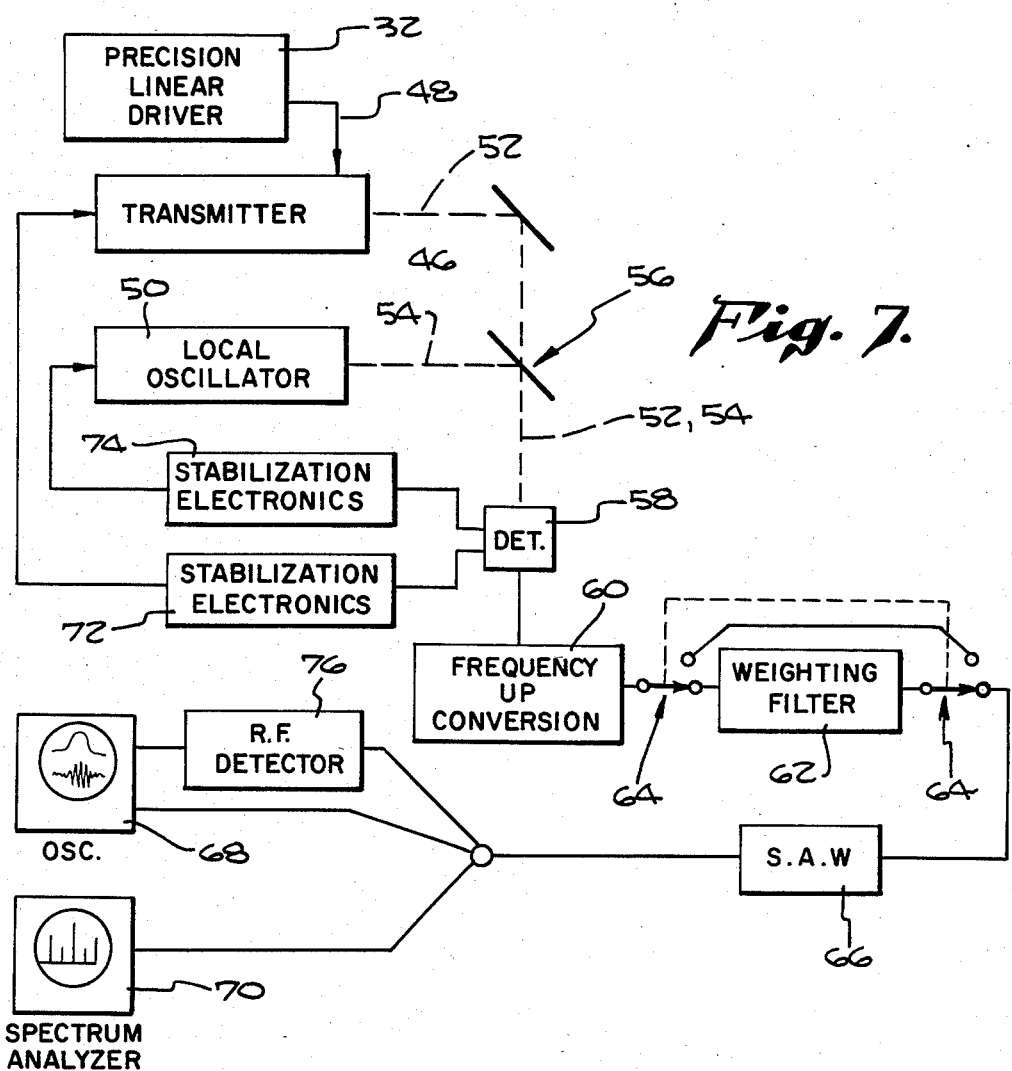
FIG. 7 is a simplified block diagram of the system used by applicants to test the present invention.

The experimental test setup used by applicants is shown as a simplified block diagram in FIG. 7. As previously described, the transmitter laser 46 is modulated by a CdTe FM cut crystal, placed inside the laser resonator. The voltage applied to the modulator at input line 48 consists of a highly linear triangular waveform ($\pm 0.5\%$ @ 750 $V_{pp}$), which in turn yields an upward and then downward frequency sweep of approximately 100 MHz. The period of the triangular waveform is 4 μs, where the upward and downward chirp are both of 2 μs width.

The local oscillator 50 is a laser of substantially identical construction to the transmitter laser 46, with the exception that the local oscillator 50 does not include the modulating crystal. The beams 52, 54 from the transmitter laser 46 and local oscillator 50, respectively, are combined at the beamsplitter 56. The combined beam 52, 54 impinges on and is detected by a (HgCd)Te, nitrogen cooled, photodiode detector 58, which, in effect, behaves as a square-law detector.

The electrical a.c. output of the detector 58 is of the form of Equation (8), where for a single chirp pulses $\mu = 50$ MHz/s, and T=2 μs. The heterodyne signal is frequency up-converted at 60 from 100 MHz to 500 MHz to correspond to the center frequency of the matched-filter. A weighting filter 62 was used in one set of measurements, to reduce the sidelobe on the compressed pulse. The chirp signal is selectively fed via switch 64 to the weighting filter 62. The chirp signal is then fed to the matched-filter 66 to be compressed. The filter 66 consists of an ultrasonic wave dispersive delay line, the principles of which are described in Reference [4]. The dispersive delay line is a Surface Acoustic Wave (SAW) device, with a chirp rate of 50 MHz/μs. A compressed pulse from the SAW 66 is then selectively observed in the form desired at the oscilloscope and spectrum analyzer.

An important part of the success of the present invention is the use of matched, grating controlled, high-pressure $CO_2$ lasers at 46, 50 coupled with the feedback loops comprising the stablizing electronics circuits at 72 and 74 connected between the detector 58 and the piezoelectric translators of the lasers 46, 50, respectively. The circuits 72, 74 adjust the drive level of the respective piezoelectric translators as a function of the frequency of the beam components 52, 54 sensed at the detector 58 whereby the basic frequency of the lasers 46, 50 is maintained exactly (i.e., in the tested example, at 100 MHz).

Component Description

The system of the tested embodiment has grating controlled, high-pressure $CO_2$ waveguide lasers at 46 and 50, which were made by the assignee, Hughes Aircraft Company. The cavity was excited by an r.f. source, which runs off a 24 V power supply. The FM cut crystal of the transmitter 46 is a $1.5 \times 1.5 \times 50$ mm CdTe crystal, produced by II-VI Corp. The SAW devices 66 were provided by the Ground Systems Group of the Hughes Aircraft Company.

Results

Figure 8:
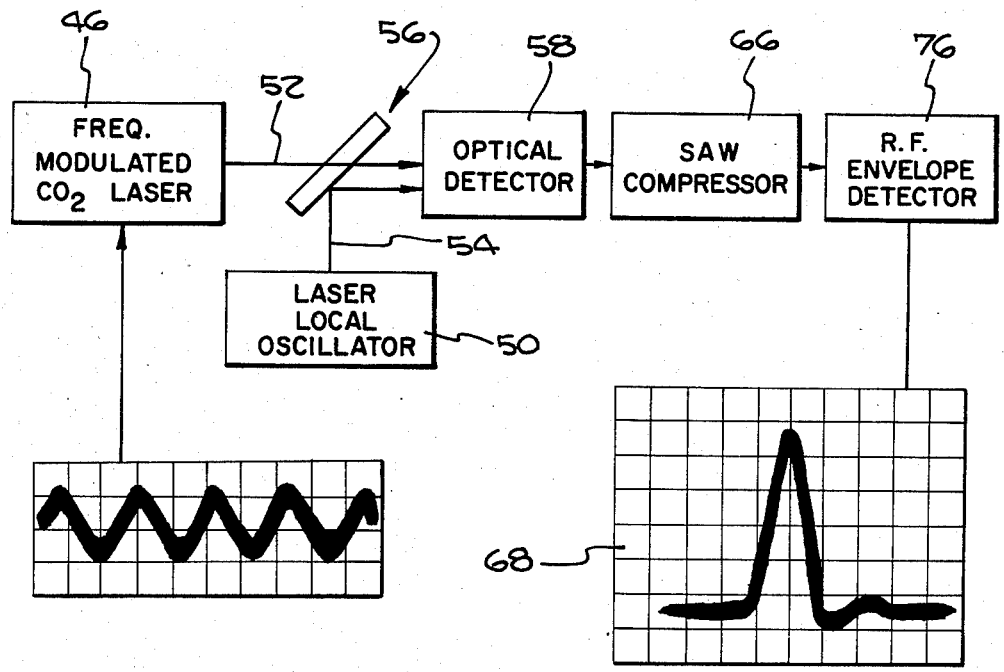
FIG. 8 is a simplified drawing partially in block form showing the triangular waveform applied to the modulating crystal of the transmitter and the detected r.f. pulses from the envelope detector in the test system of FIG. 7.

FIG. 8 shows in block form the triangular waveform applied to the FM crystal of the transmitter 46 and the detected r.f. pulses from the r.f. envelope detector 76, coming from the output of the SAW device 66. Since only the upward chirp of the SAW 66 is used in this test setup, only one side of the triangular FM sweep yields a compressed pulse. The portion of the signal which has a reverse chip direction, becomes dispersed in the SAW 66 as with a non-linear chirp as previously described.

Figure 9:
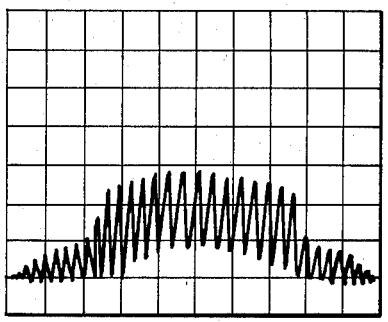
FIG. 9 is a drawing of the output waveform of the FM sweep.

The bandwidth of the FM sweep can be observed in the drawing of an output waveform of FIG. 9, to be nearly 100 MHz. This would yield a base width (between the first two nulls of the (sin x)/x of the compressed pulse of $2/\Delta f = 20$ ns. This corresponds to the drawing of an observed pulse shown in FIG. 10. The asymmetry of the shape and amplitude of the first sidelobes is attributed to a slight phase distortion, or deviation from linearity of the FM sweep. The source of this deviation may be attributed to nonlinear terms in the relations $\Delta\nu \propto (\Delta V)$[8]. Reference [4] (Chapter 11) discusses the effects of some typical distortion on matched-filter signals.

In order to quantify the amount of distortion of the signal, hence the degradation of the compressed pulse, we make use of Equation (11). In the non-ideal case where distortions are present, Equation (11) becomes an inequality. The compression factor is given by $T\Delta f$, which is the ideal case; thus, in general one finds that $$T/\tau_p \leq T\Delta f \qquad (12)$$

Figure 11:
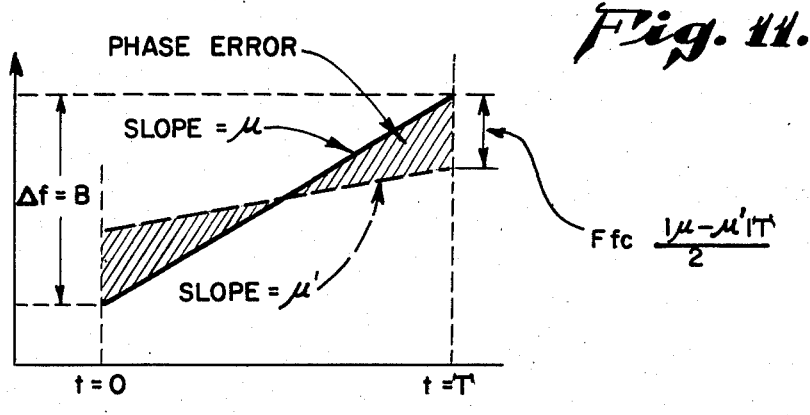
FIG. 11 is a graph of the linear delay mismatch condition encountered.

The amount of phase deviation may be used to quantify the mismatch expressed by Equation (12). The applicants have considered the case when the linear delay function of the receiver does not correspond exactly to the FM sweep of the pulse. This is done because simple analytical expressions for the phase deviations can be attained readily. This condition, referred to as linear delay mismatch, is illustrated in FIG. 11. The chirp pulse of width T is frequency swept at a rate $\mu'$, represented by the broken line. The SAW (matched-filter) requires a FM sweep of $\mu$, represented by the solid line. The frequency mismatch at the band edge is, $$f_e = \frac{|\mu - \mu'|T}{2} \qquad (13)$$

The shaded area represents the total phase error of the chirp pulse. In this linear case, one finds that the band-edge deviation is $$\phi_e = \frac{\pi|\mu - \mu'|T^2}{4} \qquad (14)$$

We define the mismatch factor as $$\gamma \equiv \frac{|\mu - \mu'|}{\mu} \qquad (15)$$

such that equation (14) becomes $$\phi_e = \frac{\pi\gamma(T\Delta f)}{4} \qquad (16)$$

where the relation $\mu T = \Delta f$ is used.

Figure 12:
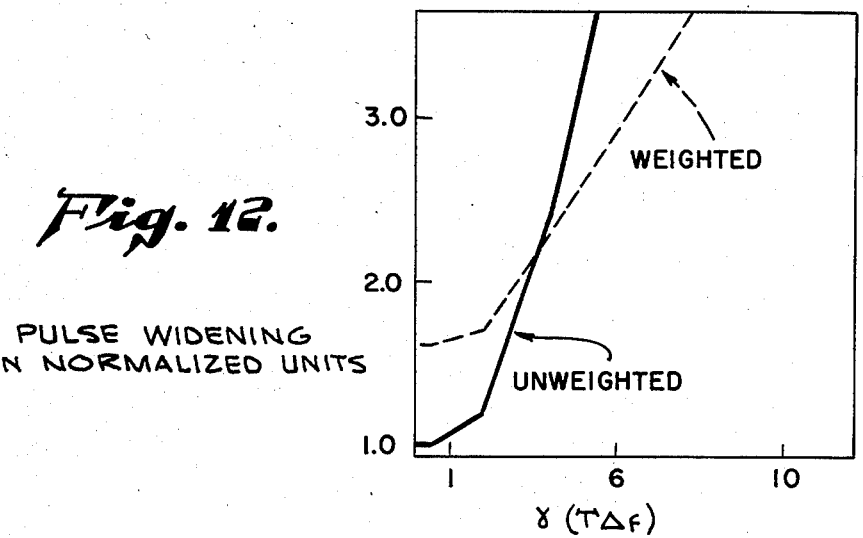
FIG. 12 is a graph giving the pulse widening degradation.

FIG. 12 gives the pulse widening degradation, as derived from the data of Klauder, et al., [9], where the degradation is plotted as a function of phase deviation in terms of $\gamma(t\Delta f)$.

Figure 10:
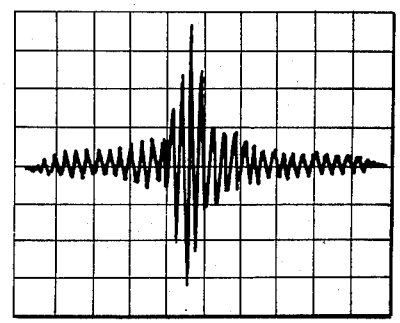
FIG. 10 is a drawing of the observed pulse.

The unweighted pulse shown in FIG. 10, was measured to have the following parameters:

$T = 2.1$ $\mu$s, compressed pulse width $\tau = 15$ ns
$\Delta f = 95$ MHz $$T/\tau = 140 < T\Delta f = 199 \qquad (17)$$

The amount of pulse widening, due to mismatch is $$T\Delta f/(T/\tau) = 1.42$$

Using the graph in FIG. 12, we obtain for pulse widening degradation $$\gamma(T\Delta f) \approx 2.5$$

This corresponds to the general appearance of the unweighted pulse given by Klauder, et al. The mismatch factor is $$\gamma = 2.5/T\Delta f \approx 1.3 \times 10^{-2} \qquad (18)$$

As it was mentioned earlier, the sidelobe amplitude, for the ideal case, lies at $-13.5$ dB. For most uses of a laser radar system, one finds that it is desirable to reduce the sidelobe amplitude, even at the price of increasing the pulse width. This may be done by what is called weighting, where the edges of the frequency band are tapered. As pointed out in Reference [9] the effect of weighting not only reduces the sidelobe amplitude, but also improves the pulse shape when a mismatch is present.

Figure 13:
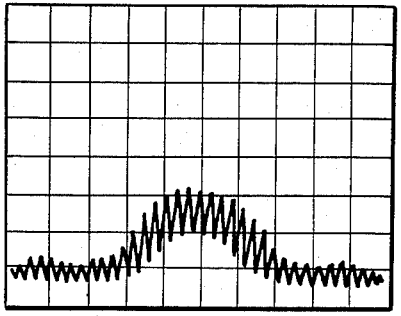
FIG. 13 is a drawing of the display of the frequency spectrum of the weighted pulse.

In our case, a transversal filter was used at 62 with a transfer function of, $$H(\omega) = 1 + \cos\left[\frac{(\omega_0 - \omega)2\pi}{\Delta\omega}\right] \qquad (19)$$

where $\omega_O$ is the center frequency and $\Delta\omega$ is the bandwidth of the chirp. FIG. 13 is a drawing of the display of the frequency spectrum of the weighted pulse, which is essentially the spectrum shown in FIG. 9 of the unweighted pulse multiplied by the transfer function of the filter, $H(\omega)$, given in Equation (19). FIGS. 14 and 15 show the r.f. pulse obtained at the output of the SAW 66, and the demodulated pulse, respectively, which are to be used for signal processing. The slight overshoot observed at the end of the demodulated pulse is an artifact of the r.f. detector.

The parameters measured for this pulse are
T = 2.1 μs
τ = 20 ns
Δf = 95 MHz
$\Delta f_{3dB}$ = 45 MHz
where $\Delta f_{3dB}$ is the bandwidth above half-power point. As expected, similar to Equation (17), we obtain $$T/\tau = 105 < T\Delta f = 199 \quad (20)$$

The amount of pulse widening is $$T\Delta f/(T/\tau) = 1.9$$

According to the graph in FIG. 12, this corresponds to a mismatch of, $$\gamma(T\Delta f) \approx 2.7 \quad (21)$$

where the weighted curve was used this time. The mismatch factor is $$\gamma = 2.7/(T\Delta f) = 1.36 \times 10^{-2} \quad (22)$$

which, as expected, corresponds to the mismatch factor calculated in Equation (18), since the same pulse was used for the weighted case. However, as mentioned earlier, for the same amount of phase distortion, the weighted pulse usually has higher quality shape and lower sidelobe level than the unweighted case.

CONCLUSIONS

Phase Distortion and Mismatch

In the system described above, a compression factor, $T\Delta f$, of near 200 was used. It was found that the mismatch factor, $\gamma$, is about $1.35 \times 10^{-2}$. For a compression of 200, this yields a phase error at the band-edges of about (from Equation (16))

$$\phi_e = \pi\gamma(T\Delta f)/4 \approx \pi/1.5$$

Since the slope of the ramp yielding the FM sweep was adjusted for optimum pulse shape, the mismatch is due to other nonlinearities at either the frequency modulator crystal or the response of the laser. The applicants are at present investigating this source of distortion such that it may be reduced further. This will allow even further narrowing of the compressed pulse and increase the resolution of the ranging capabilities.

Laser Radar System

The signal processing technique for range and Doppler measurements is similar to the one described by Hulme et al [5].

Consider a target at a distance R from the radar. The range time would be $$t_r = 2R/C \quad (23)$$

where C is the speed of light. Assuming that the target has a radial velocity, Vr, the Doppler shift, $$f_d = \frac{2V_r}{C} f_{laser},$$

will cause an additional delay of, $$t_d = -f_d/\mu \quad (24)$$

where $f_o$ is the center frequency. Thus the total measured time will be $$t_{(+)} = t_r + t_d \quad (25)$$

The transmitter emits an upward and downward chirp, where the SAW device only compresses one. By using a second SAW device with the same chirp rate characteristics, however opposite in sign $\mu_{(-)} = -\mu_{(+)}$, then the delay produced by the Doppler effect will also be opposite in sign, i.e., $$t_{d(-)} = +f_d/\mu \quad (26)$$

and the total measured delay will be $$t_{(-)} = t_r + t_{d(-)} = t_r - t_{d(+)} \quad (27)$$

Thus in order to obtain the correct parameters, one uses the relationships (26) and 27)

$$t_r = \frac{[t_{(+)} + t_{(-)}]}{2} \quad (28)$$

and $$t_d = \frac{[t_{(+)} - t_{(-)}]}{2}$$

FIG. 16 shows a graphical description of Equation (28).

The applicants have shown that the position of a modulated compressed pulse may be determined in time with an rms uncertainty of about 2 ns. Thus the range time will have an uncertainty $\delta t_r = (2\sqrt{2}/2)$ns, which yields $\delta R \approx 0.22$ meters.

The Dopplar is given by $$\delta f_d = \delta t_d \mu = \frac{2\delta V_r}{c} f_{Laser}$$

Since δtd is also about $\sqrt{2}$ ns, then the accuracy of the radial velocity is $$\delta V_r = \frac{\delta t_d}{2} \frac{\mu C}{f_{Laser}} = \frac{\delta t_d}{2} \mu \lambda_{Laser}$$

Figure 17:
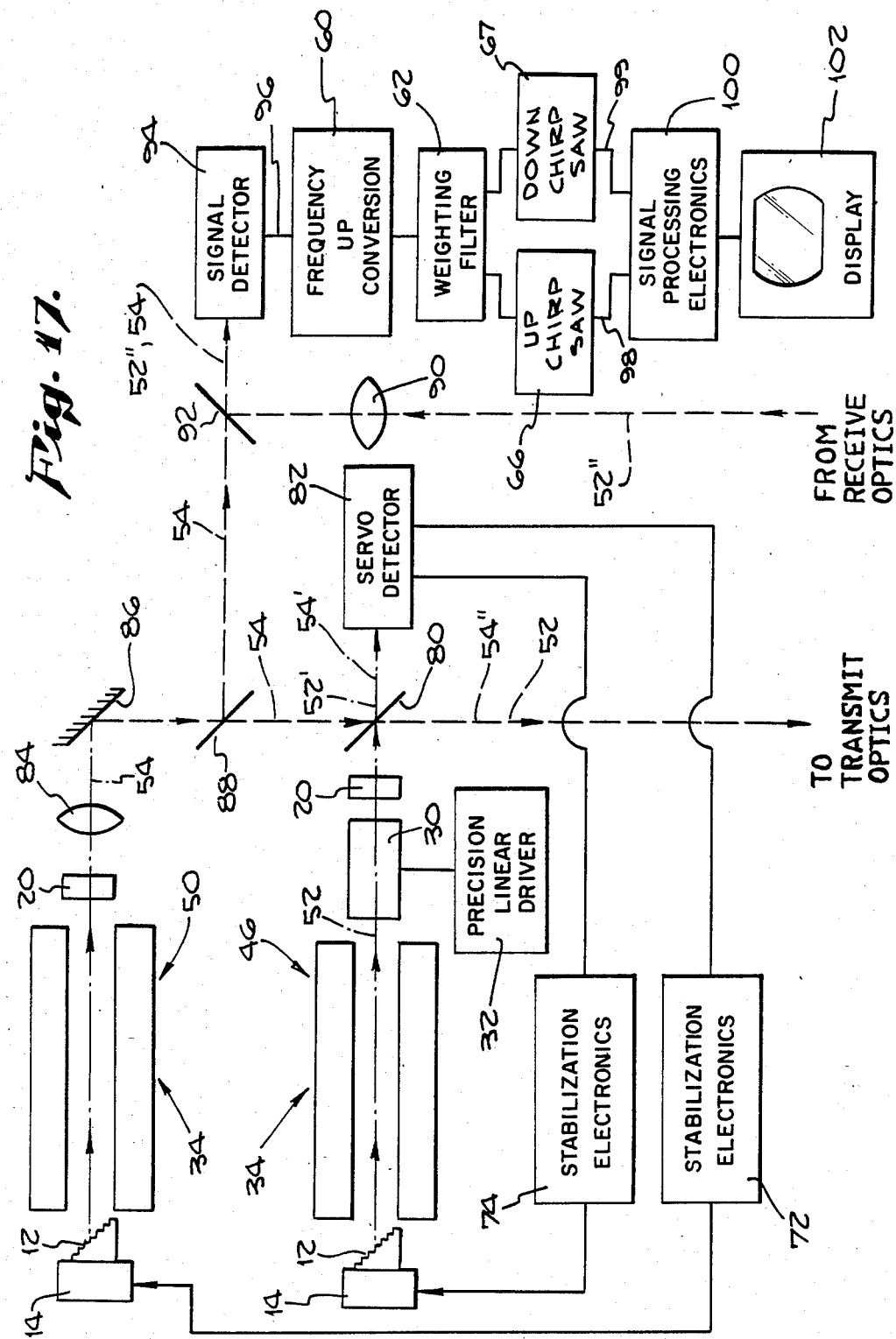
FIG. 17 is a simplified drawing of a laser radar system according to the present invention.

For a $CO_2$ laser, $\lambda_{laser} = 10.6 \times 10^{-6}$ m
then
$\delta V_r \approx 0.37$ m/s A laser radar system according to the present invention is shown in simplified form in FIG. 17. The radar system, generally indicated as 78, employs many of the same components as the test bench apparatus of FIG. 7 and, therefore, no detailed explanation of those portions will be duplicated as this point. The light beam 52 from the transmitter 46 as modulated by the CdTe FM cut crystal 30 strikes the dielectric beamsplitter 80. Beamsplitter 80 allows approximately five percent of the beam 52, labelled 52', to pass therethrough and strike the servo detector 86. The remaining ninety-five percent of beam 52 passes through whatever additional means are necessary to be emitted as the transmitted radar beam, as so labelled. The beam 54 from the local oscillator 34 passes through lens 84 to be focused onto the mirrored surface 86, from whence it is directed to dielectric beamsplitter 88. Like beamsplitter 80, beamsplitter 88 reflects approximately ninety-five percent of beam 54 and passes the remaining five percent, labelled 54', which strikes beamsplitter 80, from which ninety-five percent joins the five percent of the beam 52' from the transmitter 46 in striking servo detector 82 as a combined beam 52', 54'. The remaining five percent of the five percent of beam 54', labelled 54", is mixed with the transmitted beam 52. The amount of energy in beam 54" is so negligible as to be of no consequence. Servo detector 82 performs the function of developing the input signals to the stabilization electronics 72, 74 which are connected to the piezoelectric translators 14 of the lasers 46, 50 to maintain them exactly at the preselected base frequency, as previously described, and can provide the reference or start of FIG. 16.

The portion of the transmitted beam 52 which is scattered by a target and received is labelled 52". This received beam passes through lens 90 to be focused on dielectric beamsplitter 92, where it is mixed with the beam 54 from the local oscillator 50 to form a combined beam 52", 54 which impinges upon the signal detector 94. Those skilled in the art will recognize that in an actual production radar, the transmitted and returned beams will share a common path for at least a portion of their travel. Detector 94 converts the light beam energy striking it into a corresponding electrical signal on its output line 96, reflecting the combined beam 52", 54. The electrical signal then passes through the frequency up conversion circuit 60, the weighting filter 62, and a pair of surface acoustic wave delay device 66, 67, all previously described in detail. As is known, two SAWs (one for the up-chirp and one for the down-chirp) are employed to provide Doppler frequency shift information. The outputs 98 and 99 of the SAWs 66, 67 comprise the pulse waveforms to be used as the waveform for radar signal processing by electronics 100 in the usual manner. The output from the signal processing electronics 100 can then be used to drive a display 102 for visual interpretation by a radar operator or digitized for use in automated target acquisition sensors as is more typically the case presently.

Conclusion

The applicants, in bench tests, have demonstrated how this novel type of laser pulse compression, while enjoying the advantages of a CW heterodyne detection system, may yield accurate information in range, ±0.22 meters, and radial velocity, ±0.37 m/s. They have demonstrated how a sealed waveguide $CO_2$ laser, may be modulated to 100 MHz, using a CdTe modulator. Though theoretically one would expect a 10 ns compressed pulse width, they obtained a 15 ns pulse width. This was shown to be caused by phase distortion or mismatch, of $\gamma(T\Delta f) \approx 2.7$.

It was also shown how, by the use of a weighting filter, the quality of the compressed pulse could be improved. Though in their experiments the weighting was done in the frequency domain, $H(\omega)$, in the actual rangefinder system it would be preferred to use the time domain, h(t), such that the transmitted signal would be of the form $$E_t = h(t) A_o \exp j \left[ \omega_t t + \frac{\mu t^2}{2} \right] + CC$$

where the weighting function would be $$h(t) = 1 + \cos\left[ \frac{t}{T} (2\pi) \right]$$

for $|t| < T/2$.

It is easily seen that this would correspond to the weighting filter transfer function, $H(\omega)$, shown in Equation (19). The time domain weighting function is not susceptible to Doppler shift error from its center frequency as it would be the case with, $H(\omega)$.

Wherefore, having thus described our invention, we claim:

1. The method of operating a laser radar system comprising the steps of:
    (a) actuating a transmitter laser and a local oscillator laser to emit laser light at approximately a preselected common base frequency;
    (b) frequency modulating the light of the transmitter laser in linear chirps by passing it through an electro-optical crystal disposed within the cavity of the transmitter and driving the crystal with a linear chirp drive signal from a precision linear driver;
    (c) sensing a portion of the laser light from the transmitter laser and the local oscillator laser to determine the base frequency thereof and adjusting the piezoelectric translators of the two lasers as a function of the sensed portion to maintain the lasers emitting at exactly the preselected base frequency;
    (d) using the balance of the light from the transmitter laser as the transmitted laser beam;
    (e) receiving the returned portion of the transmitted laser beam and heterodyning it with a portion of the balance of the light from the local oscillator to form a combined beam;
    (f) detecting the combined beam and creating an electrical signal reflecting the combined beam;
    (g) using the electrical signal to activate the input transducer of a surface acoustic wave delay device to create a pulse at the output transducer thereof; and,
    (h) sensing the electrical signal from the output transducer of the surface acoustic wave delay device and using said signal as the return signal from the radar for processing and analysis.

2. The method of claim 1 and additionally comprising:
    after step (f) and before step (g) thereof, increasing the frequency of the electrical signal from a frequency matched to the detector employed in step (f) to a frequency matched to the delay device employed in step (g).

3. The method of claim 2 and additionally comprising:
    after the additional step of claim 2 and before step (g) of claim 1, passing the electrical signal through a weighting filter to reduce sidelobes thereof.

4. The method of claim 3 wherein:
said step of increasing the frequency of the electrical signal comprises increasing it to a frequency matched to the center frequency of the weighing filter employed.

5. The method of claim 3 wherein:
said step of increasing the frequency of the electrical signal comprises increasing it from a base frequency of 100 MHz to a frequency of 500 MHz.

6. A laser radar transmitter/receiver comprising:
(a) a transmitter laser including first translator means for causing said transmitter laser to emit a first beam of light at approximately a preestablished base frequency;
(b) an electro-optical crystal adapted to be connected to an actuating signal and disposed within the cavity of said transmitter laser to modulate said beam of light being emitted therefrom;
(c) precision linear driver means operably connected to said electro-optical crystal for applying a linear chirp drive signal thereto;
(d) a local oscillator laser including second translator means for causing said oscillator laser to emit a second beam of light at approximately said base frequency;
(e) first feedback control means connected to said first translator means and disposed to sense a portion of said first light beam for dynamically adjusting said first translator means to maintain said first light beam at exactly said base frequency;
(f) second feedback control means connected to said second translator means and disposed to sense a portion of said second light beam for dynamically adjusting said second translator means to maintain said second light beam at exactly said base frequency;
(g) means for transmitting said first light beam as the transmitted beam of the radar;
(h) means for receiving the returned portion of said first beam and for heterodyning it with a portion of said second beam to form a combined beam;
(i) detector means disposed to have said combined beam impinge thereon for outputting a chirped electrical signal reflecting said combined beam; and,
(j) surface acoustic wave delay device means connected to receive said electrical signal at an input thereof for transforming the electrical chirped wave form signal reflection of said combined beam into an electrical pulse wave form signal at an output thereof to be used as the return signal for radar signal processing.

7. The radar of claim 6 and additionally comprising:
frequency up conversion means disposed between said detector means and said delayed device means for increasing the frequency of said electrical signal from a frequency matched to said detector means to a frequency matched to said delay device means.

8. The radar of claim 7 and additionally comprising:
weighting filter means disposed between said frequencies up conversion means and said delay device means for removing sidelobes from said electrical signal.

9. The radar of claim 8 wherein:
said frequency up conversion device is adapted to increase said frequency to a frequency matched to the center frequency of said weighting filter means.

10. The radar of claim 8 wherein:
said delay device means comprises a pair of surface acoustic wave delay devices responsive to an up-chirp and a down-chirp, respectively.

11. The radar of claim 6 wherein:
said crystal is a CdTe FM cut crystal.

12. The radar of claim 6 wherein:
said lasers are grating controlled, high-pressure $CO_2$ lasers.

13. In a chirped, heterodyned laser radar system employing a transmitting laser, a local oscillator laser, and intra-cavity electro-optical device within the transmitting laser to modulate the transmitted laser beam, and a surface acoustic wave delay device to transform the electrical signal of the detected return beam into a pulse wave form for processing, the improvement comprising:
(a) a CdTe FM cut crystal employed as the intra-cavity device;
(b) a precision linear driver device connected to drive said crystal with a chirp drive signal linear to at least ±0.5%; and,
(c) feedback loop means connected to the drive translators of the lasers and adapted to sense the frequency of the light from said lasers for maintaining said lasers emitting light at exactly a common preestablished base frequency.

14. The improvement to a radar of claim 13 wherein:
said lasers are grating controlled, high-pressure $CO_2$ lasers.

* * * * *